United States Patent
Idaszak et al.

(10) Patent No.: US 6,573,894 B1
(45) Date of Patent: Jun. 3, 2003

(54) SYSTEMS, METHODS AND COMPUTER PROGRAM PRODUCTS FOR CONVERTING IMAGE DATA TO NONPLANAR IMAGE DATA

(75) Inventors: Raymond L. Idaszak, Apex, NC (US); Richard W. Zobel, Jr., Raleigh, NC (US); David T. Bennett, Chapel Hill, NC (US); Suresh Balu, Carrboro, NC (US)

(73) Assignee: Elumens Corporation, Cary, NC (US)

(*) Notice: Subject to any disclaimer, the term of this patent is extended or adjusted under 35 U.S.C. 154(b) by 0 days.

(21) Appl. No.: 09/605,588

(22) Filed: Jun. 28, 2000

Related U.S. Application Data

(63) Continuation of application No. 08/806,788, filed on Feb. 26, 1997, now Pat. No. 6,104,405.

(51) Int. Cl.$^7$ .............................. G06T 15/20
(52) U.S. Cl. ................. 345/427; 345/581; 345/585; 345/582; 345/419
(58) Field of Search ................. 345/427, 585, 345/581, 582, 419; 382/154

(56) References Cited

U.S. PATENT DOCUMENTS

| | | | | |
|---|---|---|---|---|
| 4,763,280 A | | 8/1988 | Robinson et al. | 364/518 |
| 4,862,388 A | * | 8/1989 | Bunker | 345/427 |
| 5,319,744 A | | 6/1994 | Kelly et al. | 395/136 |
| 5,425,137 A | | 6/1995 | Mohan et al. | 395/133 |
| 5,493,490 A | | 2/1996 | Johnson | 364/401 |
| 5,673,377 A | * | 9/1997 | Berkaloff | 345/430 |
| 5,776,050 A | | 7/1998 | Chen et al. | 600/117 |

FOREIGN PATENT DOCUMENTS

| WO | WO 97/01241 | 1/1997 |
|---|---|---|

OTHER PUBLICATIONS

Walnum, 3–D Graphics Programming with OpenGL™, Que Corporation, 1995, pp. 1–107.
Neider et al., OpenGL Programming Guide: The Official Guide to Learning OpenGL, Release 1, Addison–Wesley Publishing Company, 1993, pp. 1–18.
OpenGL Architecture Review Board, OpenGL Reference Manual: The Official Reference Document for OpenGL, Release 1, Addison–Wesley Publishing Company, 1992, pp. 1–39.
International Search Report, PCT/US98/03790, Jun. 17, 1998.

* cited by examiner

*Primary Examiner*—Cliff N. Vo
*Assistant Examiner*—Kimbinh T. Nguyen
(74) *Attorney, Agent, or Firm*—Myers Bigel Sibley & Sajovec

(57) ABSTRACT

Image data is converted to nonplanar image data for display on a nonplanar display, using a planar image graphics computer system, such as an OpenGL® system, which converts image data to planar image data for display on a planar display. A transformation matrix is obtained from the planar image graphics computer system. A plurality of vertices of the image data are multiplied by the obtained transformation matrix, to produce transformed image data. The transformed image data is nonplanarly distortion corrected to produce nonplanar image data. A passthrough transformation matrix, such as an identity matrix, is provided to the planar image graphics computer system. The nonplanar image data is then input to the planar image graphics computer system for further processing. The nonplanar image data which is processed by the planar image graphics computer system is then displayed on a nonplanar display. Accordingly, the image data is distortion corrected and manipulated as necessary, so that the distortion corrected image data can be applied to a standard planar image graphics computer system for image processing.

29 Claims, 7 Drawing Sheets

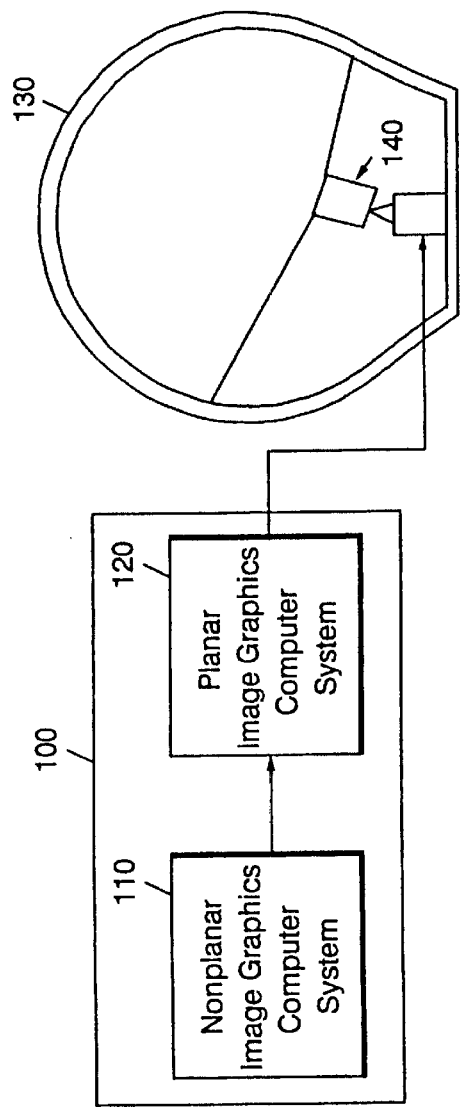
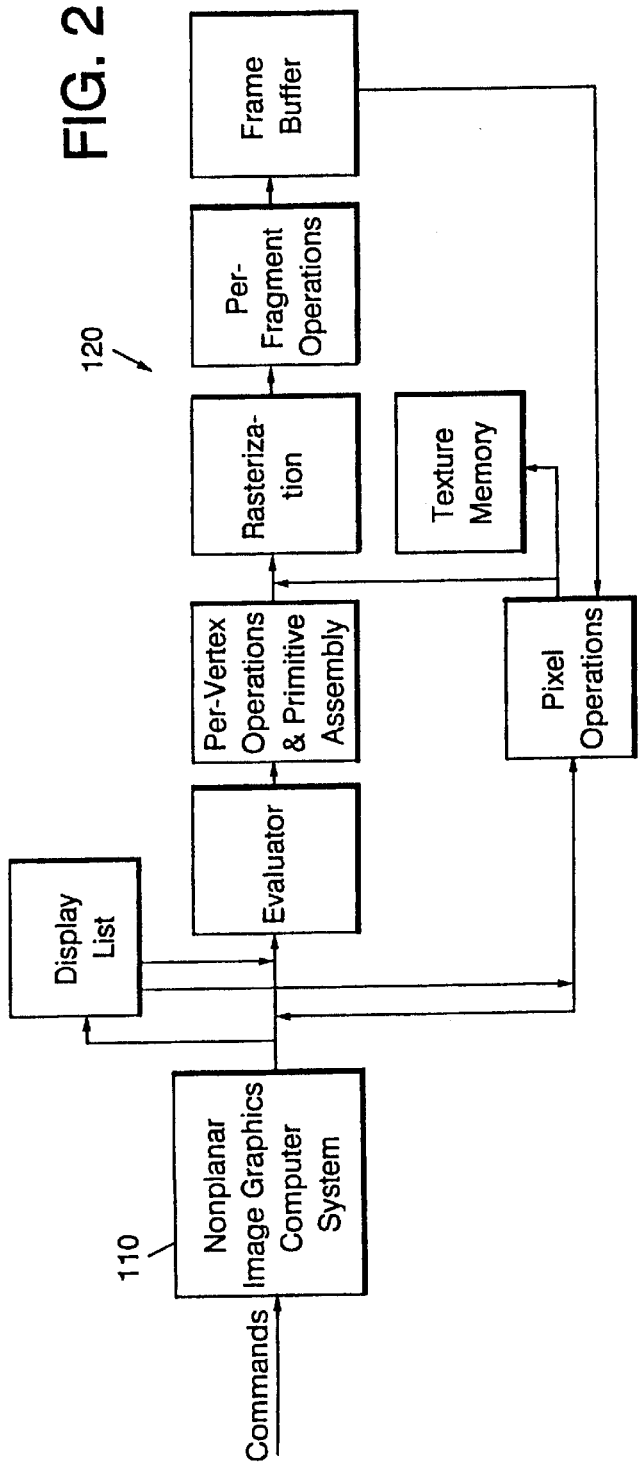

US 6,573,894 B1

SYSTEMS, METHODS AND COMPUTER PROGRAM PRODUCTS FOR CONVERTING IMAGE DATA TO NONPLANAR IMAGE DATA

CROSS REFERENCE TO RELATED APPLICATION

This application is a continuation of U.S. application Ser. No. 08/806,788, filed Feb. 26, 1997, U.S. Pat. No. 6,104,405.

FIELD OF THE INVENTION

This invention relates to data processing systems, methods and computer program products and more particularly to image processing systems, methods and computer program products.

BACKGROUND OF THE INVENTION

Hemispherical optical projection systems and methods, i.e. systems and methods which project images at an angle of at least about 160 degrees, are used to project images onto the inner surfaces of domes. Hemispherical optical projection systems and methods have long been used in planetariums, commercial and such as OMNIMAX® theaters. With the present interest in virtual reality, hemispherical optical projection systems and methods have been investigated for projecting images which simulate a real environment. Such images are typically computer-generated multimedia images Including video, but they may also be generated using film or other media. Home theater has also generated much interest, and hemispherical optical projection systems and methods are also being investigated for home theater applications.

Alternate Realities Corporation, the assignee of the present invention, has embarked in a program of research and development to produce a low-cost, versatile, portable, high quality hemispherical optical projection system. In application Ser. No. 08/593,041, entitled *Multi-Pieced, Portable Projection Dome and Method of Assembling the Same* to Zobel, Jr. et al., which is assigned to the assignee of the and building a low-cost, portable dome are described. In application Ser. No. 08/593,699, entitled *Tiltable Hemispherical Optical Projection Systems and Methods having Constant Angular Separation of Projected Pixels* to Colucci et al., optical systems and methods which are optimized for hemispherical optical projection are described.

A major problem of hemispherical optical projection systems and methods is the provision of appropriate data for display on a dome without multimedia images including video, and images which use film or other media, are generally generated for computer display, or theater display. It will be understood by those having skill in the art that although some of those displays may deviate slightly from absolute planarity, the image data is assumed to be projected onto a planar display.

In the field of image processing, hardware and software has been developed for planar image graphics computer systems which convert three-dimensional image data to planar image data for display on a planar display. Manufacturers of planar image graphics computer systems include Silicon Graphics Incorporated (the Infinite Reality or Onyx lines of systems), Sun Microsystems (the SPARC Station and Ultra lines of systems), IBM (the RISC System 6000 Series and Power lines of systems), Hewlett-Packard (the Visualize, Freedom and PRO Vision lines of systems) and many others. These systems process image data for display on a two-dimensional display at speeds which are generally higher than those of general purpose computers or workstations. The above-noted manufacturers and others have now standardized their planar image graphics computer systems (hardware and software) to operate under a standard architecture, referred to as OpenGL®. OpenGL is a programming graphics on platforms from many manufacturers. Over, four hundred commands are provided which can be used to display shapes, compose animated three-dimensional scenes, complete with lighting, anti-aliasing and texture-mapping.

Because OpenGL is an industry standard, programs and libraries written on one platform can be ported easily to another. Moreover, because most of the complex math which is necessary for producing interactive three-dimensional applications is hidden within the commands, developers are relieved of having to decipher lengthy formulas in order to render images on a planar display. The OpenGL architecture is described in publications entitled "3D Graphics programming with OpenGL ®", Clayton Wallnum, 1995, Que Corporation; "OpenGL® Reference Manual, The Official Reference Document for OpenGL® Release 1", OpenGL® Architecture Review Board, sponsoring editor David Rogelberg, 1992; and "OpenGL® Programming Guide, The Official Guide to Learning OpenGL®, Release 1", OpenGL® Architecture Review Board, Jackie Knighter, Doni Davis and Nason Woo, 1993, the disclosures of all of which are hereby incorporated herein by reference.

Unfortunately, image data produced by image graphics computer systems which are designed for planar displays will generally be distortion corrected upon projection on a nonplanar display. For example, as images are scaled, translated and/or rotated, they generally will become distorted in shape when they are projected on a nonplanar display such as a dome. This distortion can be a major stumbling block in the acceptance of a dome as a replacement for a planar display.

Many approaches can be taken to correct these distortions. One approach would be to design a nonplanar image graphics computer system which can produce nonplanar images at high speed. Unfortunately, such a hardware and software development effort would likely require many millions of dollars to implement, as evidenced by the massive development efforts which OpenGL.

Another approach would be to require all content producers to modify their data to accommodate the unique environment of a dome. Unfortunately, this requirement would also likely hinder the acceptance of a dome among content providers.

Yet another alternative would be to design and/or port a computer program, which can operate on a general purpose personal computer or workstation, to provide nonplanar image data processing. Unfortunately, such a program would also likely require large development and/or porting efforts and would likely be slower than state-of-the-art image processing systems using planar image graphics computer systems such as OpenGL systems.

Still another alternative would be to divide the nonplanar display into a large number of approximately planar segments and use a plurality of planar image display systems to produce the nonplanar display. Such a solution is often referred to as "tiling", and is often used in flight simulators and wide-angle theaters. Unfortunately, multiple projection systems may be costly and difficult to set up and align and may still include distortions because the display surfaces are not truly planar.

The above description has focused on hemispherical displays. However, there is also interest in many other forms of nonplanar displays wherein wide angle projection of an image is generated using a single image pipeline. For example, virtual reality helmets may use a nonplanar, non-hemispherical viewing area. In other applications, images may be projected onto cylindrical projection surfaces. In yet other applications, images may be projected on the inside of a cube such as a room. All of these display applications may encounter the problems described above in attempting to reduce distortion upon projection of image data on a non-planar display.

SUMMARY OF THE INVENTION

In view of the above problems, it is therefore an object of the present invention to provide improved methods, systems (apparatus) and computer program products for converting image data to nonplanar image data for display on a non-planar display.

It is another object of the present invention to provide methods, systems and computer program products for converting image data to nonplanar image data which do not require development of entirely new hardware/software image processing architectures.

These and other objects are provided according to the present invention by methods, systems and computer program products for converting image data to nonplanar image data wherein the image data is nonplanarly distortion corrected to produce nonplanar image data and the nonplanar image data is input to a planar image graphics computer system which converts image data to planar image data for display on a planar display, for processing by the planar image graphics computer system. Accordingly, the image data is distortion corrected and manipulated as necessary, so that the distortion corrected image data can then be applied to a standard planar image graphics computer system such as an OpenGL system. The power of the OpenGL system can then be used for image processing. It is therefore not necessary to develop a new architecture for nonplanar image processing. Moreover, the large hardware and software investment in OpenGL and other planar image processing architectures can be used advantageously, and the nonplanar image processing may be noninvasive to OpenGL capabilities.

In particular, it will be understood by those having skill in the art that a planar image data processing system generally employs a transformation matrix which is generally a 4×4 matrix which is used to transform vectors and other fundamental geometric primitives corresponding to vertices of objects using matrix multiplication. According to the invention, a transformation matrix is generated and obtained from the planar image graphics computer system. A plurality of vertices of the image data is then matrix multiplied by the obtained transformation matrix, to produce transformed image data. The transformed image data is then nonplanarly distortion corrected to produce nonplanar image data. A passthrough transformation computer system. For example, an identity matrix may be provided. The nonplanar image data is then input to processing by the planar image graphics computer system.

Thus, the matrix multiplication is performed outside the planar image graphics computer system using a transformation matrix which is generated by the planar image data computer system. However, remaining graphics processing is preferably performed using the high-speed hardware and software of the planar image graphics computer system. The power of the planar image graphics computer system is thereby used, without requiring content providers to modify their image data.

As described above, the transformation matrix is generally a 4×4 matrix, each element of which is generally a floating point number. Accordingly, the obtained of transformation matrices from the planar image graphics computer system, using subroutine calls or other conventional techniques, may slow down processing speed dramatically. According to an aspect of the invention, it has been found that the transformation matrix need only be obtained once for each object in the image data. Moreover, in other cases, the transformation matrix need only be obtained once for a plurality of objects in the image data. Accordingly, high speed processing may be provided.

According to an embodiment of the present invention, a pair of flags are used to govern the obtaining of the transformation matrix. In particular, a first flag keeps track of which transformation matrix is being operated upon. As is well known to those having skill in the art, there are generally two transformation matrices which are manipulated in planar image graphics computer systems: a projection_view matrix and a modelview matrix. Each of these matrices is generally a 4×4 matrix. The projection_view matrix is used to perform planar graphical operations which project images onto a planar display. The modelview matrix is used when the projection is tile same but the viewpoint of the observer is varying. Other transformation matrices may also be used.

The second flag is used to keep track of when to the invention, a new transformation matrix is preferably not calculated more often than it needs to be calculated. Accordingly, if the transformation matrix is being applied to a single object, the transformation matrix may be used for all vertices of that object. Thus, for example, if a single object is being rotated, the transformation matrix may be used for all vertices of that object, as determined by the second flag. Moreover, if a plurality of objects are being rotated, for example due to rotation of the viewpoint, the transformation matrix may be used for all vertices of all of the objects. The transformation matrix is preferably not recalculated, since replacing the existing transformation matrix in the planar image graphics computer system, recalculating the new matrix and then obtaining the recalculated. Matrix from the planar image graphics system. The operations of fetching, storing and matrix multiplying of double floating point numbers may be time consuming. The present invention can thus provide high speed processing of coplanar images, using standard planar image processing systems.

BRIEF DESCRIPTION OF THE DRAWINGS

FIG. 1 is a block diagram of systems, methods and computer program products for converting image data to nonplanar image data according to the invention.

FIG. 2 is a more detailed block diagram of the graphics work station of FIG. 1.

FIG. 4, illustrate detailed image processing operations for methods, systems and computer program products which convert image data to nonplanar image data using a planar image graphics computer system, according to the invention.

DETAILED DESCRIPTION OF PREFERRED EMBODIMENTS

Figure 3:
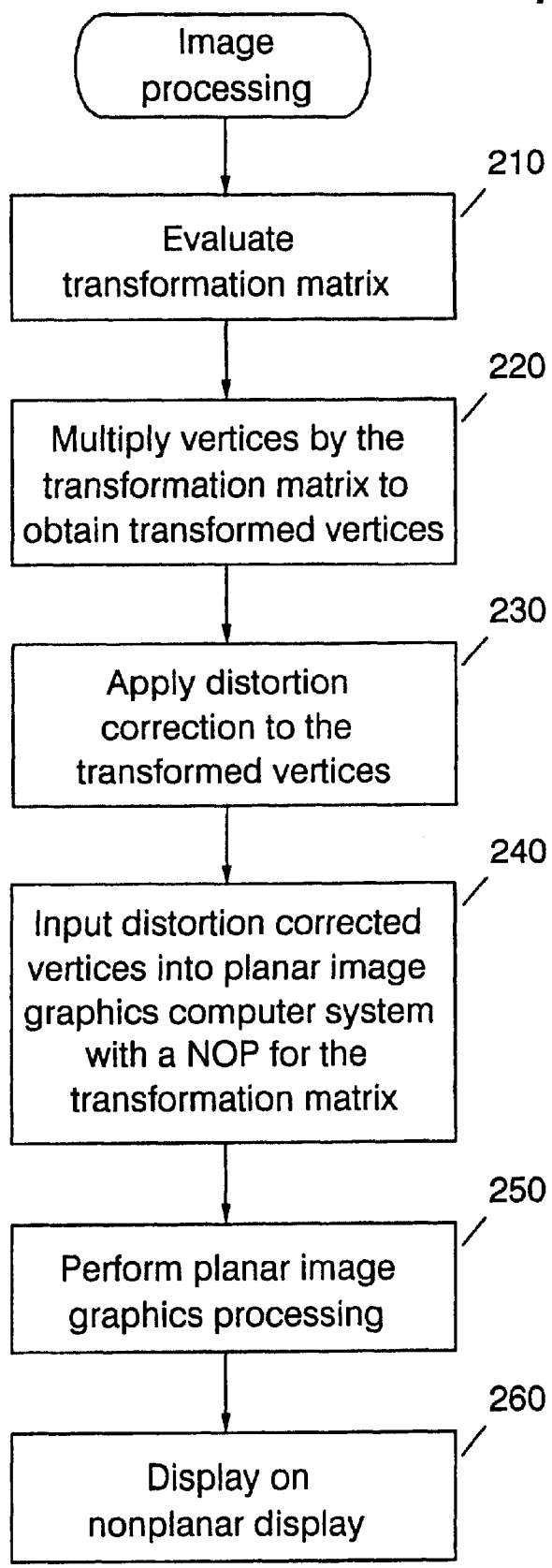
FIG. 3 is a high level description of image processing operations for converting image data to computer system, according to the invention.
Figure 4A:
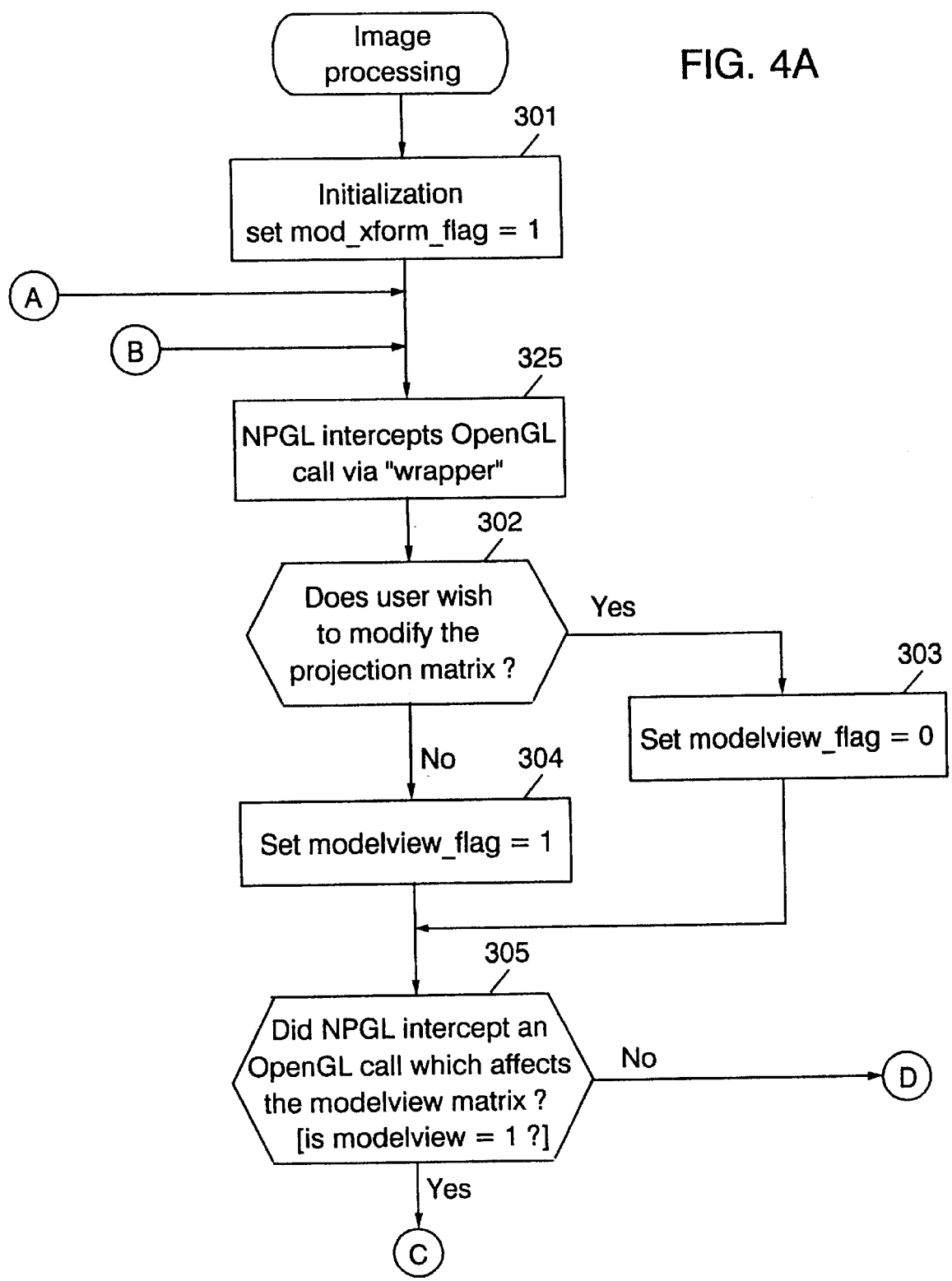
FIGS. 4A–4E which together form
Figure 4B:
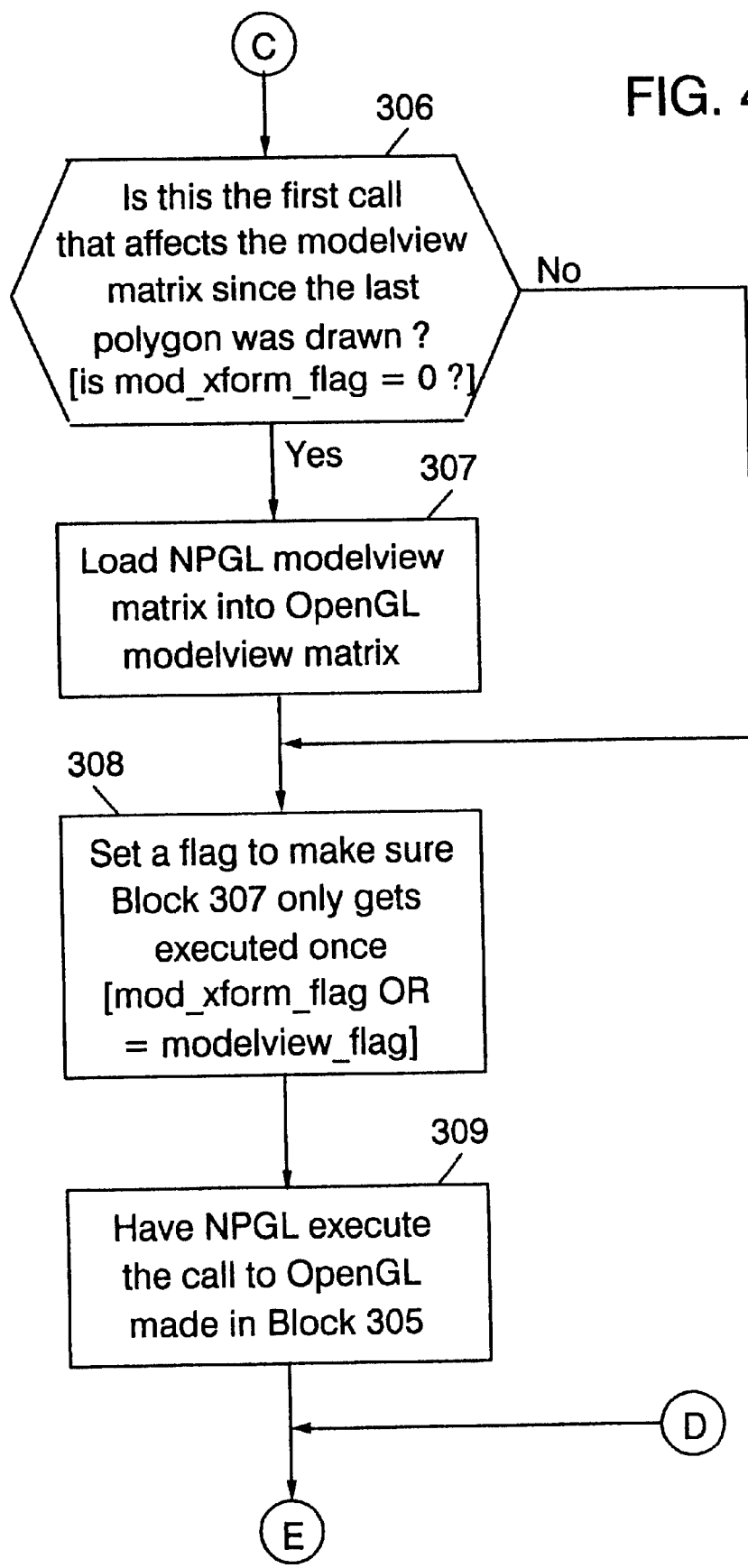
Figure 4C:
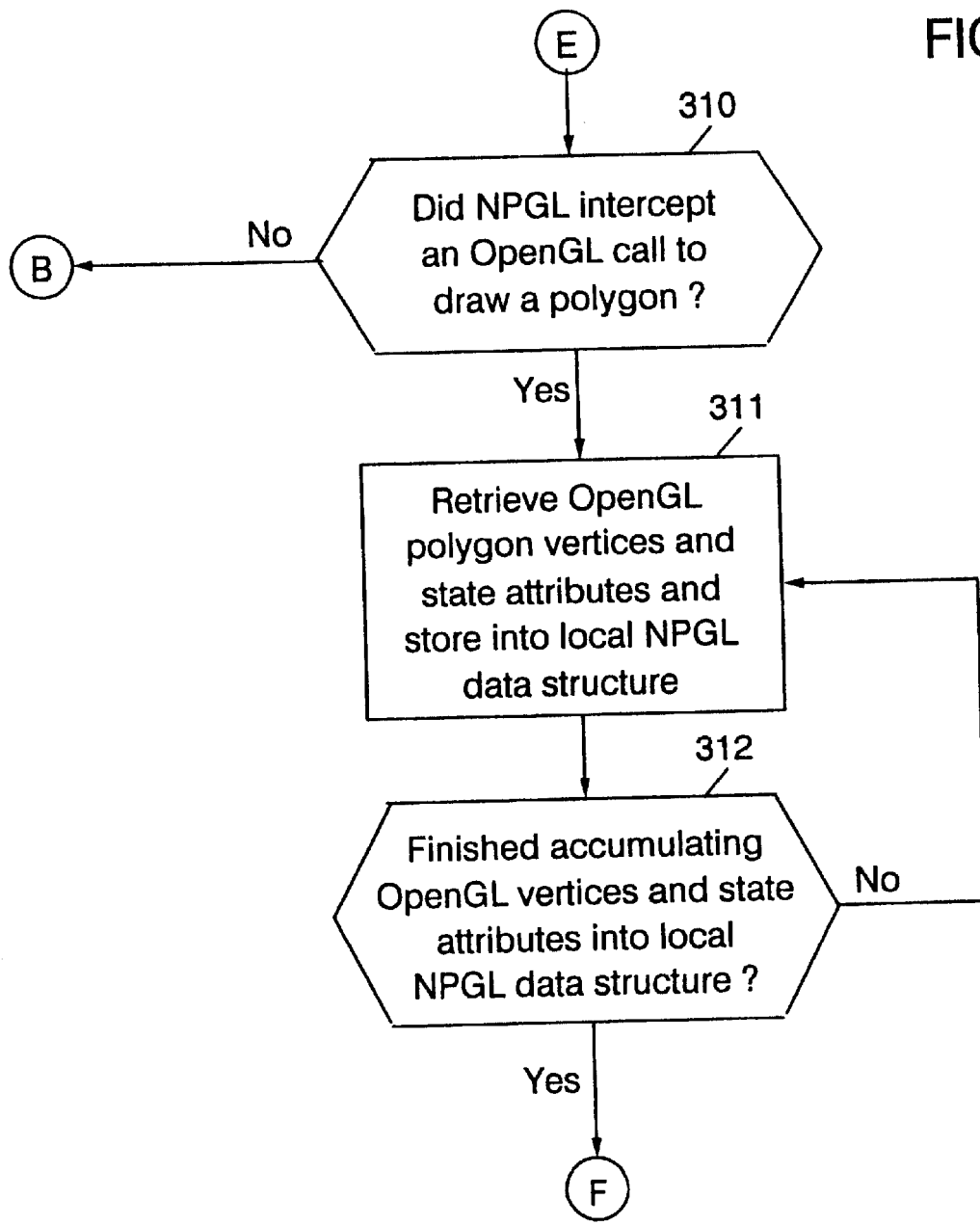
Figure 4D:
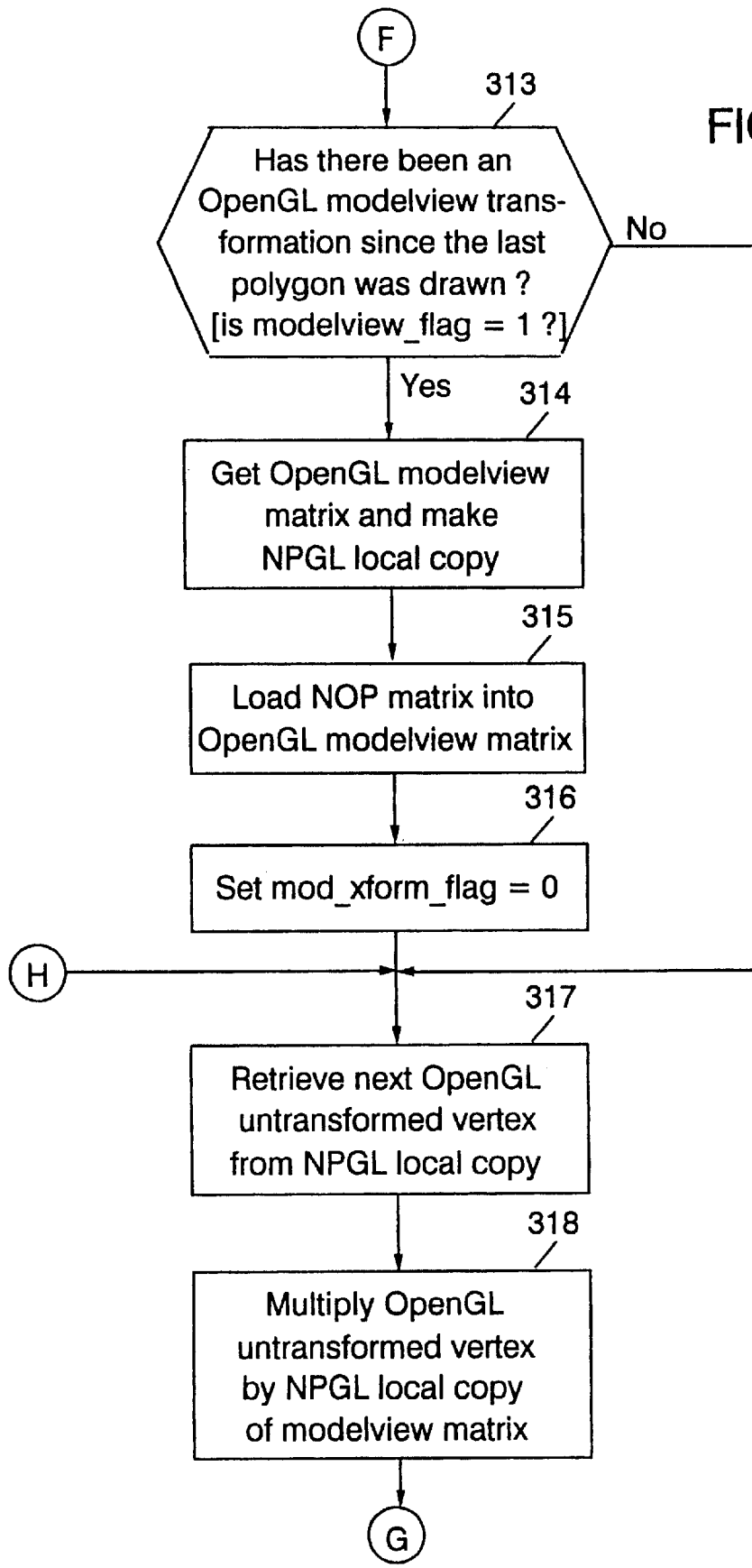
Figure 4E:
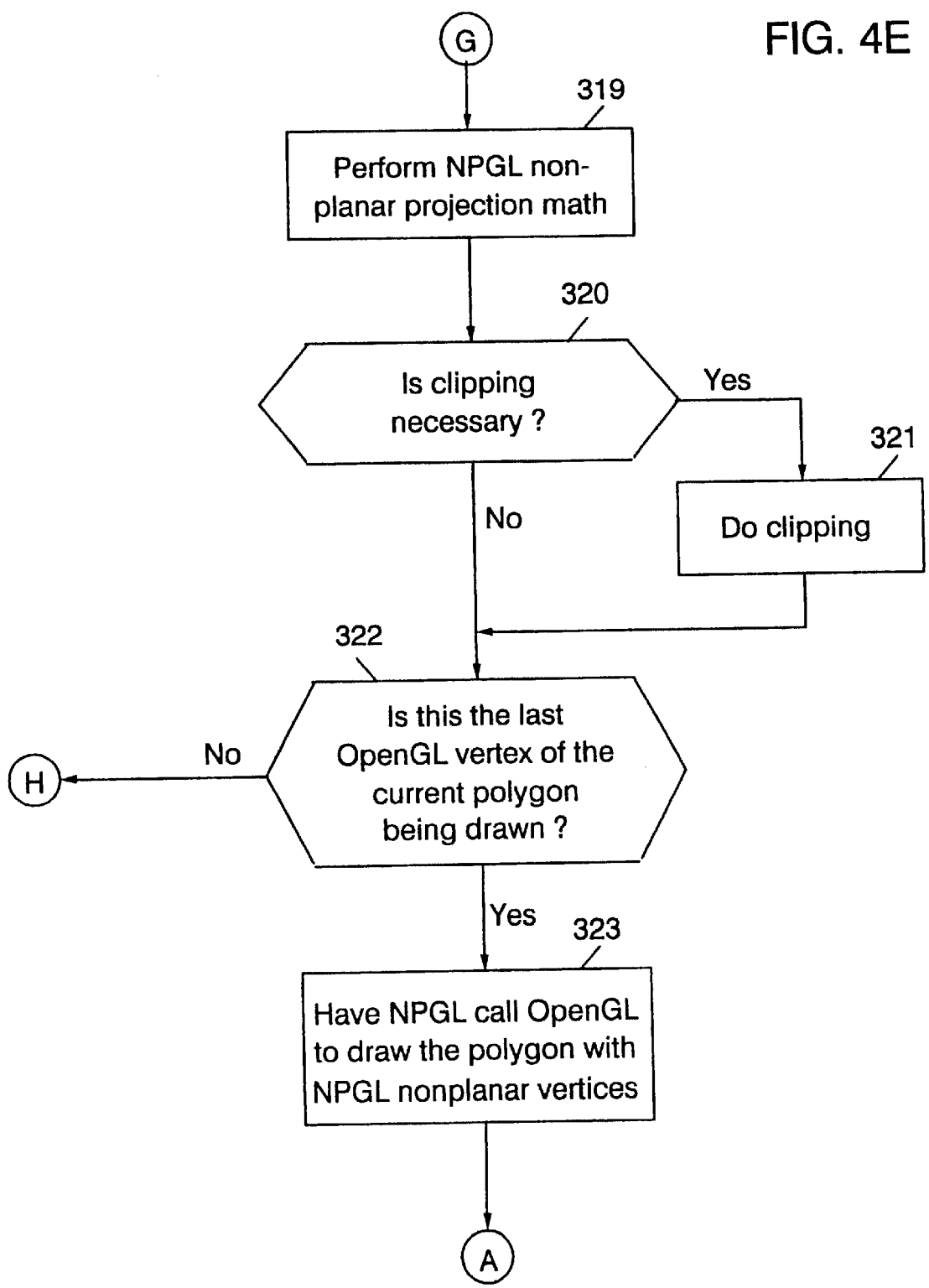

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as a method, data processing system or program product. Accordingly, the present invention may take tie form of an entirely hardware embodiment, an entirely software embodiment or an embodiment combining software and hardware aspects. Furthermore, the present invention may take the form of a computer program product on a computer-readable storage medium having computer-readable program code means embodied in the medium. Any suitable computer-readable medium may be utilized including hard disks, CD-ROMs, optical storage devices, or magnetic storage devices.

The present invention is described below with reference to flowchart illustrations of methods, apparatus (systems) and computer program products according to the invention. It will be understood that each block of the flowchart illustrations, and combinations of blocks in the flowchart illustrations, can be implemented by computer program instructions. These computer program instructions may be loaded onto a computer or other programmable data processing apparatus to produce a machine, such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Referring now to FIG. 1, a block diagram of systems, methods and computer program products for converting image data to nonplanar image data according to the invention is shown. As shown in FIG. 1, a planar image graphics computer system 120, such as an OpenGL computer system, receives commands from a nonplanar image graphics computer system 110. The image data from the planar image graphics computer system 120 is then projected onto a nonplanar display such as dome 130 using nonplanar projection system 140.

Nonplanar image graphics computer system 110 and planar image graphics computer system 120 may be separate and distinct computer systems. However, preferably, nonplanar image graphics computer system 110 and planar image graphics computer system 120 are both contained in a graphics workstation 100, such as an OpenGL or other industry standard planar image graphics computer system. In this case, the planar hardware, whereas nonplanar image graphics computer system is generally embodied as a software system which generally operates using the central processing unit (CPU) or coprocessor of the planar image graphics computer system.

FIG. 2 illustrates details of the graphics workstation 100 of FIG. 1. FIG. 2 is a modification of the figure on Page 4 of the above-identified OpenGL® Reference Manual. As shown, planar image graphics computer system 120 is implemented by. Interconnected hardware components, while nonplanar image graphics computer system 110 is a software component which runs on the CPU or coprocessor of the graphics workstation 100 or microcode of the graphics hardware.

As already described above, OpenGL is an industry standard 3D graphics library. A nonplanar image graphics computer system 110 according to the present invention may be implemented as a computer program which maps one for one the names and arguments of subroutines which are available in the 3D graphics library upon which it is built. This is sometimes referred to as a "wrapper" library, because it sits on Lop of and emulates the actual commands which are being made to the 3D graphics library. It will also be understood, however, that nonplanar image graphics computer system 110 may be implemented using hardware or combinations of hardware and software.

Referring now to FIG. 3, image processing operations for converting image data to nonplanar image data using a planar image graphics computer system will now be described. As already described, it will be understood that these operations may be performed by software, hardware or combinations thereof to represent means, steps or computer program product instructions. Referring now to FIG. 3, at Block 210, a transformation matrix is evaluated. This operation preferably takes place in the planar image graphics computer station 120 using tie hardware of the planar image graphics computer system which is designed for this matrix evaluation. Matrix evaluation may take place in response to a command to rotate scale, translate or other similar matrix transformation operations.

Then, referring to Block 220, the transformation matrix is obtained from the planar image graphics computer system and the vertices of the object or objects are multiplied by the transformation matrix to obtain transformed vertices. The multiplication operation of Block 220 preferably takes place in nonplanar image graphics computer system 110. Since this multiplication operation typically multiplies a vector by a 4×4 matrix, it can be performed at high speed using a general purpose computer CPU or coprocessor.

At Block 230, distortion correction is then applied to the transformed vertices. Distortion correction is also preferably applied in the nonplanar image graphics computer system 110 of FIG. 1. In general, the distortion correction which is applied will depend upon the type of nonplanar display. For example, for a hemispherical optical projection system, the distance formula is used to calculate new x and y coordinates, as will be described below.

Referring again to FIG. 3, at Block 240, the distortion corrected vertices are then input into the planar image graphics computer system 120 with a NOP being applied to the transformation matrix. As is well known to those having skill in the art, a NOP is a value or set of values which is set such that their inclusion in a formula or operation has the effect of leaving the output result the same as the input operation. For example, in the common 3D graphics operation of a vector-matrix multiply, a NOP matrix might refer to an identity matrix. However, for other operations, a NOP may be other than the identity matrix.

At Block 250, planar image graphics processing is then performed on the distortion corrected vertices using the full power of the planar image graphics computer system 120. After processing, at Block 260, the data is displayed on the nonplanar display 130.

FIGS. 4A–4E describe detailed image processing operations for methods, systems and computer program products which convert image data to nonplanar image data for display on a nonplanar display, using a planar image graphics computer system, according to the invention. These figures will collectively be referred to as FIG. 4. In the embodiment of FIG. 4, the nonplanar image graphics computer system 110 is referred to as a "Non-planar Graphics Library" or "NPGL". As already described, the NPGL may be implemented as a wrapper library which sits on top of and emulates the commands being made to the planar graphics library, such as OpenGL.

NPGL is preferably a library and not necessarily an application. As such, there are many possible points of entry by the user code calling NPGL, and there may be no invariant order in which the subroutines of the NPGL library will be called. Accordingly, the flowchart of FIG. 4 follows a typical, application calling sequence, but can successfully be applied to any arbitrary calling sequence. In particular, a series of decision blocks is used throughout the flowchart to repeatedly test for various conditions, so that the flowchart will bypass certain blocks if the test fails. Thus, for example, Block 325 (intercept OpenGL call) and Block 302 (check if user needs to modify projection view_matrix) follow Block 301 (initialization). If after Block 325, the user application may go directly to Block 310 (check if user needs to draw a polygon) without invoking any of Blocks 302–309 because this is the random access calling nature of a library. However, the flowchart of FIG. 4 will accommodate out-of-sequence operations by failing all intermediate flowchart tests included in Blocks 302–309 to arrive at Block 310.

In order for NPGL to be an open system which is based on OpenGL standards, it preferably contains exactly the same subroutine names as the underlying 3D graphics library upon which it is based. For example, in the case of OpenGL, the NPGL and OpenGL libraries should preferably have exactly the same subroutine names and arguments. However, NPGL directly calls OpenGL. This may present a naming conflict which is flagged by the compiler. In order to overcome this potential problem, dynamic shared objects, referred to as DSOs or shared libraries, are used to resolve the naming conflict. Using DSOs or shared libraries, NPGL looks up tile address of the equivalent OpenGL call at run time, and the compiler is instructed that this is the preferred mode of operation. Thus, applications based on OpenGL do not need to be recompiled to use NPGL. This may be a significant advantage.

Referring now to Block 301, initialization operations are performed. In particular, the mod_xform_flag is initialized to "1", or "True" to inform NPGL that the default condition entering the code is that the modelview matrix has been modified as its initial operation. Specifically, this modification is the initial setting of the modelview matrix by OpenGL to the NOP matrix outside of NPGL.

Then, at Block 325, NPGL intercepts an OpenGL command or call which is made by the user application code via a "wrapper" of the sane name and argument list. Then, at Block 302, a check is made if the user wishes to modify the projection_view matrix. Accordingly, this decision block informs NPGL via OpenGL which matrix stack to modify: the projection_view or modelview matrix. It will be understood by those having skill in the art that there may be other matrix stacks which are available in many 3D graphics libraries. However, generally only one matrix stack is active at any one time. Thus, other matrices may be modified and more than one matrix may be used at any given time according to the present invention.

Still referring to FIG. 4, at Block 303, if the user wishes to modify the projection_view matrix, the modelview_flag is set to "False" or "0". Alternatively, at Block 304, if the user desires to modify the modelview matrix, the modelview_flag is set to "1" or "True".

Then, at Block 305, a test is made as to whether NPGL intercepted an OpenGL call which affects the modelview matrix. Examples of such OpenGL calls include, but are not limited to, rotation, scaling, translation or other operations. Thus, in the NPGL wrappers for each of these calls, a check is made if modelview_flag=1, which means that the user is attempting to modify the modelview matrix via that OpenGL call. If the modelview_flag=0, it might mean that the user is attempting to make a similar call which affects the projection_view matrix or other matrix.

If the modelview_flag is equal to 1, then at Block 306, a test is made as to whether this is the first call that affects the modelview matrix since the last polygon was drawn. In other words, does mod_xform_flag=0? Stated differently, a test is made as to whether this is the first of this type of call, i.e. a call that affects the modelview matrix, for example, rotation, scaling or translation, since the last polygon was drawn. It will also be understood that Blocks 305 and 306 may be grouped together as the following single conditional statement:

If NOT mod_xform_flag AND modelview_flag.

Assuming that this is the first call that affects the modelview matrix, then at Block 307, the NPGL modelview matrix is loaded into the OpenGL modelview matrix. The NPGL modelview matrix is loaded into the OpenGL modelview matrix, so that OpenGL, with its efficient hardware, can manage matrix operations at high speed. Accordingly, if this is the first modeling transformation since the last polygon was drawn, then the OpenGL hardware, rather than NPGL, manages the generation of the subsequent modelview matrix until it is time to draw the next polygon. Thus, a new transformation matrix will be calculated by the OpenGL hardware.

It will be understood that in Block 315, described below, the OpenGL hardware is loaded with the NOP matrix when it is used to draw the polygons. However, prior to drawing a polygon, the OpenGL hardware should contain the real modelview matrix in order to calculate a new modelview matrix using the OpenGL hardware efficiency. NPGL keeps a copy of the real modelview matrix via Block 314. It is this copy that is being loaded in Block 307.

It will also be understood that the "load matrix" operation generally need only be performed once between every set of polygon draw operations. Typically, a user nay draw hundreds or thousands of polygons at a time.

For example, assume that 100,000 polygons have been drawn via Blocks 310–323, which included the NOP matrix in the OpenGL modelview matrix slot. The user code then returns and it is time to input a new rotation, translation and scaling in that order. The next call after these 100,000 polygons were drawn which affects the modelview matrix is tile rotation, which is flagged by Block 305. Block 306 flags that this rotation is the first of any modelview-modifying calls to affect the modelview matrix since the 100,000 polygons were drawn. Therefore, Block 307 loads the real modelview matrix that it saved from Block 314, and Block 308 sets mod_xform_flag=1, so that the subsequent translate and scale calls will pass on the test in Block 305, but now fail the test in Block 306. Thus, Block 307 never gets executed. It generally is desired to execute Block 307 as infrequently as possible, because Block 307 is generally slow in performance relative to other OpenGL operations.

Continuing with Block 308, a flag is set to ensure that Block 307 only gets executed once beyond the last set of polygons which were drawn. However, these calls should pass if some other type of matrix is active, such as the projection_view matrix. Accordingly, rather than simply setting mod_xform_flag=1, all cases may be handled by the operation mod_xform_flag OR=modelview flag. In other words: mod_xform_flag=mod_xfrom_flag OR modelview_flag. For example, if the projection_view matrix is active, then by definition modelview_flag=0 and thus the operation of Block 308 would set the mod_xform_flag=0. These operations will therefore perform correctly where the projection_view matrix is active.

Referring now to Block 309, the NPGL executes the call to OpenGL which was made in Block 305. In Block 305, an intercepted OpenGL call was identified as being one that modified the modelview matrix and was consequently processed in Blocks 305–308. In Block 309, the call is actually executed by having NPGL pass through the appropriate arguments to the equivalent OpenGL call. Accordingly, Block 309 corresponds to the operations of Block 210 of FIG. 3 to evaluate the transformation matrix.

Then, at Block 310, a test is made as to whether NPGL intercepted an OpenGL call to draw a polygon. It will be understood by those having skill in the art that the word polygon is used herein to represent any drawing primitive including, but not limited to, points, lines, etc. If "yes", then at Block 311, the OpenGL polygon vertices and state attributes are retrieved and stored into the local NPGL data structure. It will be understood by those having skill in the art that a polygon is generally defined as having certain attributes including, but not limited to, geometric vertices defining its edges and corners, its color, the normal to the plane it lies in, texture coordinates, etc. Block 311 accumulates these attributes into a local NPGL structure.

A test is made at Block 312 as to whether all the OpenGL polygon vertices and state attributes for a polygon have been stored in the local NPGL data structure. If not, processing of Block 311 continues until they all have been accumulated. It will be understood that Blocks 311 and 312 capture all of the polygon's information before it is drawn. However, this is not necessary because it is possible to interleave Blocks 311–312 and Blocks 313–323 such that the operations in Blocks 313–323 are performed as each polygon vertex is captured.

Then, referring to Block 313, a test is made as to whether there has been an OpenGL modelview transformation since the last polygon was drawn. In other words, a test is made as to whether the modelview_flag is equal to 1. NPGL needs this information to correctly calculate its nonplanar math. If modelview_flag is equal to 1, then the operations of Block 314–316 are performed.

Then, at Block 314, the OpenGL modelview matrix is obtained and an NPGL local copy is made. At Block 315, an NOP matrix is loaded into the OpenGL modelview matrix. Accordingly, Block 315 corresponds to a portion of the operations of Block 240 of FIG. 3. It will be understood by those having skill in the art that a typical NOP matrix may include, but is not limited to, the identity matrix. The NOP matrix is placed into the OpenGL modelview matrix because the NPGL takes over the OpenGL system. More specifically, where OpenGL originally performed planar math, NPGL has now instructed OpenGL to do inert math by loading the NOP matrix into the OpenGL modelview matrix. NPGL will instead do the math itself, using the nonplanar math of Blocks 318–319.

As was described above relative to Block 307, the loading operation of Block 315 may be relatively time consuming. However, the load operation is preferably not performed more frequently than it needs to be. For example, assume that the rotation, scaling and translation from Blocks 305–309 have been completed. Then, in Block 310, 100,000 polygons are about to be drawn one after the next without rotations, translations, etc., between them. For the first polygon and only the first polygon of these 100,000 polygons, Blocks 313–316 are preferably performed. Then, Blocks 317–324 proceed to draw the remaining 99,999 polygons without executing Blocks 313–316 again, because Block 316 set mod_xform_flag=0. This causes Blocks 313–316 to be bypassed via tile conditional statement in Block 313.

Then, at Block 316, mod_xform_flag is set to 0 so that subsequent polygons drawn sequentially do not perform the redundant and relatively expensive operation of retrieving the modelview matrix information from OpenGL (Block 314) and setting the OpenGL modelview matrix to NOP (Block 315).

Then, at Block 317, the next OpenGL untransformed vertex is retrieved from the NPGL local copy. The local copy was made in Blocks 311–312. Block 317 is the beginning of a loop which actually draws the polygon to the output device.

At Block 318, the OpenGL untransformed vertex is multiplied by the NPGL local copy of the modelview matrix. This corresponds to the operation of Block 220. This generates the transformed vertices. The exact mathematical operation which is performed in Block 318 will generally vary with tile variation required in Block 319 to perform the nonplanar mathematics. These operations may include, but are not limited to, the standard vector-matrix multiply which is commonly performed.

Then, referring to Block 319, NPGL nonplanar projection math is performed. This operation corresponds to Block 230 of FIG. 3. The modularity and flexibility of Block 319 can incorporate mathematical operation for a variety of nonplanar displays, such as domes, cylinders, etc. For purposes of completeness, the NPGL nonplanar projection math for a hemispherical projection system will be described.

In order to perform a hemispherical distortion correction to the transform vertices, the following operations are performed. First, a distance function is performed using the formula $D=SQRT\ (X_{planar}^2+Y_{planar}^2+Z_{planar}^2)$, where $X_{planar}$, $Y_{planar}$ and $Z_{planar}$ are the X, Y and Z coordinates of the vertex and SQRT is the square root function. Then, the nonplanar X and Y coordinates are obtained by the formulas $X_{nonplanar}=X_{planar}/D$ and $Y_{nonplanar}=Y_{planar}/D$ where $X_{nonplanar}$ and $Y_{nonplanar}$ are the X and Y coordinates of the nonplanar coordinates. The nonplanar Z coordinate generally need not be calculated because it is generally calculated using Z buffer or other conventional techniques. The nonplanar projection math for cylindrical or other nonplanar displays may be derived geometrically and need not be described further herein. It will be understood that hemispherical distortion correction math can vary from the above as a function of specific lens properties.

Then, at Block 320, a test is made as to whether geometric clipping is necessary. If geometric clipping is necessary, which may be unique to the nonplanar topography of the display, it is checked for in Block 320 and performed in Block 321. It will be understood that clipping may be performed at other places in the operations, depending upon the type of clipping that is performed and what type of nonplanar math is being performed in Block 319. Then, at Block 322, a test is made as to whether this is the last OpenGL vertex of the current polygon being drawn. If not, a loop is made to Block 317 until retrieving and processing of all the vertices of the current polygon is finished.

Finally, at Block 323, NPGL calls OpenGL two draw the polygon with NPGL nonplanar vertices. This corresponds to Blocks 250 and 260 of FIG. 3. It will be understood that Blocks 317–322 are looped until all the vertices of the current OpenGL polygon were collected and processed with the nonplanar math. Block 323 is generally executed by having NPGL pass through the appropriate arguments to the equivalent OpenGL call.

Accordingly, the speed, performance and standard graphics library of a planar image graphics computer system can be used to generate nonplanar image data for display on a nonplanar display.

In the drawings and specification, there have been disclosed typical preferred embodiments of the invention and, although specific terms are employed, they are used in a generic and descriptive sense only and not for purposes of limitation, the scope of the invention being set forth are the following claims.

That which is claimed:

1. A method for converting three-dimensional image data to nonplanar three-dimensional image data for display on a nonplanar display, using a planar image graphics computer system which converts three-dimensional image data to planar image data for display on a planar display, comprising the steps of:
    obtaining from the planar image graphics computer system, a transformation matrix;
    multiplying a plurality of vertices of the three-dimensional image data by the obtained transformation matrix, to produce transformed three-dimensional image data;
    nonplanarly distorting the transformed three-dimensional image data to produce nonplanar three-dimensional image data;
    providing a passthrough transformation matrix to the planar image graphics computer system; and
    inputting the nonplanar three-dimensional image data to the planar image graphics computer system for further processing by the planar image graphics computer system.

2. A method according to claim 1 wherein the three-dimensional image data includes a plurality of three-dimensional objects, each having a plurality of vertices, and wherein the obtaining step is performed once for each of the three-dimensional objects.

3. A method according to claim 1 wherein the three-dimensional image data includes a plurality of three-dimensional objects, each having a plurality of vertices, and wherein the obtaining step is performed once for the plurality of three-dimensional objects.

4. A method according to claim 1 further comprising the step of:
    displaying the nonplanar three-dimensional image data which is processed by the planar image graphics computer system, on a nonplanar display.

5. A method according to claim 1 wherein the planar image graphics computer system is an OpenGL computer system.

6. A method according to claim 4 wherein the displaying step comprises the step of:
    displaying the nonplanar three-dimensional image data which is processed by the planar image graphics computer system, on a hemispherical display.

7. A method according to claim 1 wherein the step of providing a passthrough transformation matrix to the planar image graphics computer system comprises the step of:
    providing an identity transformation matrix to the planar image graphics computer system.

8. A method according to claim 1 wherein the obtaining step is preceded by the step of:
    evaluating a transformation matrix in the planar image graphics computer system in response to an input command.

9. A method for converting three-dimensional image data to nonplanar three-dimensional image data for display on a nonplanar display, comprising the steps of:
    nonplanarly distorting the three-dimensional image data to produce nonplanar three-dimensional image data; and
    inputting the nonplanar three-dimensional image data to a planar image graphics computer system which converts three-dimensional image data to planar image data for display on a planar display, for processing by the planar image graphics computer system.

10. A method according to claim 9 further comprising the step of:
    displaying the nonplanar three-dimensional image data which is processed by the planar image graphics computer system, on a nonplanar display.

11. An image processing system comprising:
    a planar image graphics computer system which converts three-dimensional image data to planar image data for display on a planar display; and
    a nonplanar image graphics computer system, comprising:
        means for obtaining from the planar image graphics computer system, a transformation matrix;
        means for multiplying a plurality of vertices of the three-dimensional image data by the obtained transformation matrix, to produce transformed three-dimensional image data;
        means for nonplanarly distorting the transformed three-dimensional image data to produce nonplanar three-dimensional image data;
        means for providing a passthrough transformation matrix to the planar image graphics computer system; and
        means for inputting the nonplanar three-dimensional image data to the planar image graphics computer system for further processing by the planar image graphics computer system.

12. An image processing system according to claim 11 wherein the three-dimensional image data includes a plurality of three-dimensional objects, each having a plurality of vertices, and wherein the obtaining means obtains a transformation matrix once for each of the three-dimensional objects.

13. An image processing system according to claim 11 wherein the three-dimensional image data includes a plurality of three-dimensional objects, each having a plurality of vertices, and wherein the obtaining means obtaining a transformation matrix once for the plurality of three-dimensional objects.

14. An image processing system according to claim 11 further comprising:

a nonplanar display which is responsive to the planar image graphics computer system, to display the nonplanar image data which is processed by the planar image graphics computer system.

15. An image processing system according to claim 14 wherein said nonplanar display is a hemispherical display.

16. An image processing system according to claim 11 wherein the planar image graphics computer system is an OpenGL computer system.

17. An image processing system according to claim 11 further comprising a graphics workstation including a central processing unit and graphics hardware, wherein the planar image graphics computer system is embodied in the graphics hardware and wherein the nonplanar image graphics computer system is embodied as a stored program which executes on the central processing unit.

18. An image processing system according to claim 11 wherein the means for providing a passthrough transformation matrix to the planar image graphics computer system comprises:

means for providing an identity transformation matrix to the planar image graphics computer system.

19. An image processing system according to claim 11 wherein the planar image graphics computer system further comprises:

means for evaluating a transformation matrix in the planar image graphics computer system in response to an input command.

20. An image processing system according to claim 11 wherein the planar image graphics computer system is responsive to a predetermined command set and wherein the nonplanar image graphics computer system is a wrapper library which is responsive to the predetermined command set.

21. An image processing system comprising:

means for nonplanarly distorting three-dimensional image data to produce nonplanar three-dimensional image data; and a planar image graphics computer system which converts three-dimensional image data to planar image data for display on a planar display, and which is responsive to the nonplanar image data to process the nonplanar image data for display on a nonplanar display.

22. A system according to claim 21 further comprising:

a nonplanar display which is responsive to the planar image graphics computer system, to display the nonplanar image data which is processed by the planar image graphics computer system.

23. A computer program product for converting three-dimensional image data to nonplanar three-dimensional image data for display on a nonplanar display, using a planar image graphics computer system which converts three-dimensional image data to planar image data for display on a planar display, said computer program product including a computer-readable storage medium having computer-readable program code embodied in the medium, the computer-readable program code comprising:

computer-readable program code for obtaining from the planar image graphics computer system, a transformation matrix;

computer-readable program code for multiplying a plurality of vertices of the three-dimensional image data by the obtained transformation matrix, to produce transformed three-dimensional image data;

computer-readable program code for nonplanarly distorting the transformed three-dimensional image data to produce nonplanar three-dimensional image data;

computer-readable program code for providing a passthrough transformation matrix to the planar image graphics computer system; and computer-readable program code for inputting the nonplanar three-dimensional image data to the planar image graphics computer system for further processing by the planar image graphics computer system.

24. A computer program product according to claim 23 wherein the three-dimensional image data includes a plurality of three-dimensional objects, each having a plurality of vertices, and wherein the computer-readable program code for obtaining obtains a transformation matrix once for each of the three-dimensional objects.

25. A computer program product according to claim 23 wherein the three-dimensional image data includes a plurality of three-dimensional objects, each having a plurality of vertices, and wherein the computer-readable program code for obtaining obtains a transformation matrix once for the plurality of three-dimensional objects.

26. A computer program product according to claim 23 wherein the planar image graphics computer system is an OpenGL computer system.

27. A computer program product according to claim 23 wherein the computer-readable program code for providing a passthrough transformation matrix to the planar image graphics computer system comprises:

computer-readable program code for providing an identity transformation matrix to the planar image graphics computer system.

28. A computer program product according to claim 23 wherein the planar image graphics computer system is responsive to a predetermined command set and wherein the computer program product is a wrapper library which is responsive to the predetermined command set.

29. A computer program product for converting three-dimensional image data to nonplanar three-dimensional image data for display on a nonplanar display, said computer program product including a computer-readable storage medium having computer-readable program code embodied in the medium, the computer-readable program code comprising:

computer readable program code for nonplanarly distorting the three-dimensional image data to produce nonplanar three-dimensional image data; and computer readable program code for inputting the nonplanar three-dimensional image data to a planar image graphics computer system, which converts three-dimensional image data to planar image data for display on a planar display, and which is responsive to the nonplanar three-dimensional image data for display on a nonplanar display.

* * * * *